Jan. 26, 1926. 1,571,019
R. J. H. LUCAS
NONGLARE TRANSPARENT SHADE FOR AUTOMOBILES AND OTHER VEHICLES
Filed July 26, 1924
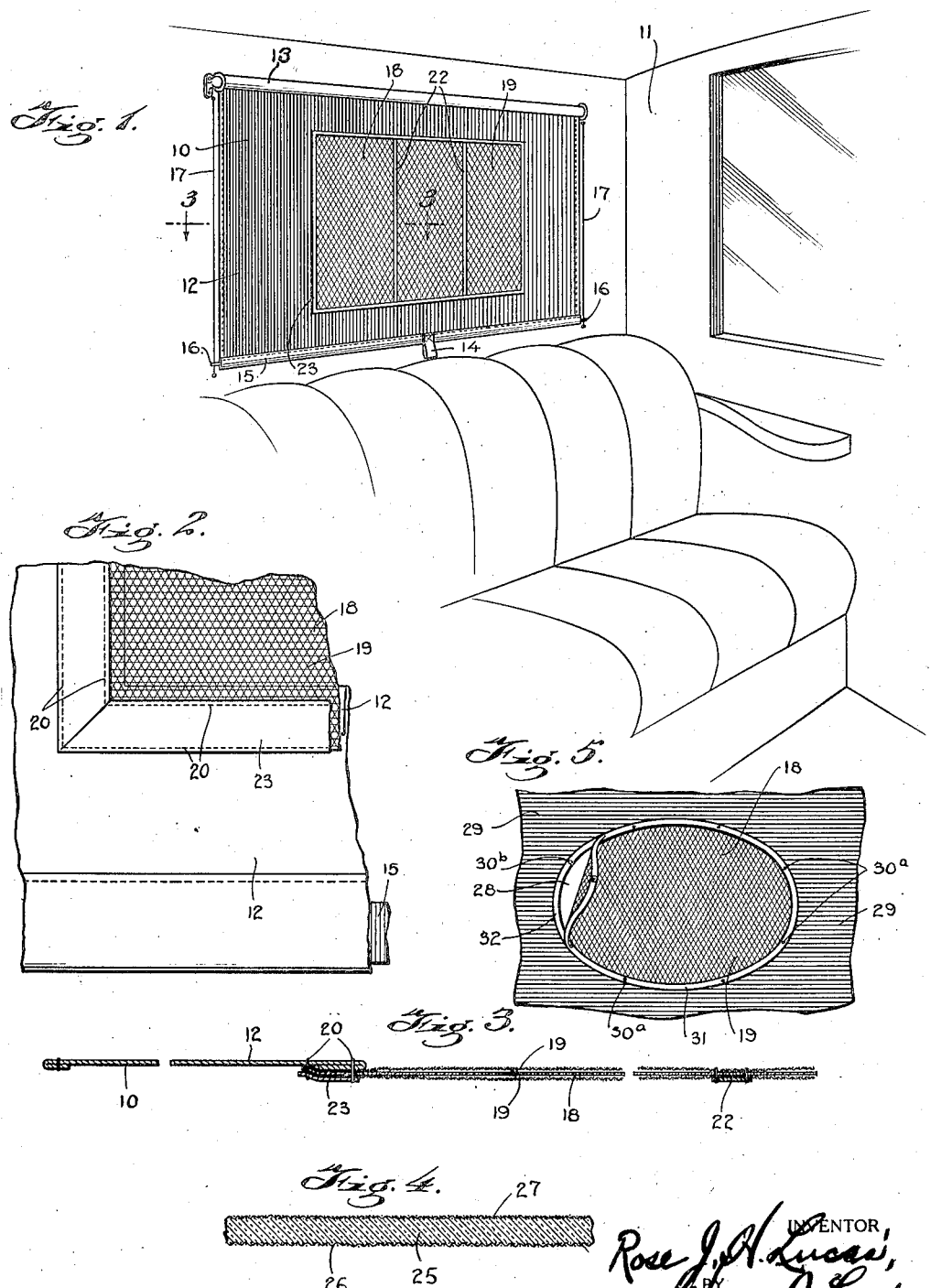

Patented Jan. 26, 1926.

1,571,019

UNITED STATES PATENT OFFICE.

ROSE J. H. LUCAS, OF EAST ORANGE, NEW JERSEY.

NONGLARE TRANSPARENT SHADE FOR AUTOMOBILES AND OTHER VEHICLES.

Application filed July 28, 1924. Serial No. 728,486.

*To all whom it may concern:*

Be it known that I, ROSE J. H. LUCAS, a citizen of the United States of America, residing at East Orange, county of Essex, State of New Jersey, have invented certain new and useful Improvements in Nonglare Transparent Shades for Automobiles and Other Vehicles, of which the following is a specification.

This invention relates to non-glare transparent shades for automobiles and other vehicles.

Pursuant to the invention, the shade is particularly applicable at night on a rear window of a sedan or other type of automobile, to provide for rear vision of the headlights and other lights of approaching automobiles and other vehicles but without glare. It will be understood that shades embodying my invention are also useful for windows of railroad and other vehicles as well as for use on stationary windows.

The transparency of the shade is provided by a sheet of celluloid, gelatine or the like serving as a light filtering means, combined with suitable light retarding and dissipating means preferably of such nature or arrangement relative to the light filtering means as to enhance the strength and preclude tearing or cracking of the transparent material when lowered or raised or when rolled upon itself and stored.

Further features and objects of the invention will be more fully understood from the following detail description and the accompanying drawings, in which Fig. 1 is a perspective view of the interior of an automobile sedan, showing a shade embodying my invention in lowered position relative to the rear window;

Fig. 2 is a detail elevation, of one corner of the shade, on an enlarged scale;

Fig. 3 is a sectional view on line 3—3 of Fig. 1, on a greatly enlarged scale;

Fig. 4 is a sectional view showing a modification; and

Fig. 5 is a front elevation of a shade embodying my invention, applied to the rear opening of the top of a touring type of automobile.

Referring to Fig. 1, the shade 10 is shown in use at the rear window of the body 11 of a sedan. The shade illustrated in the drawings comprises generally the sheet 12 of opaque material, the usual roller 13, a finger hold 14, attached to the lower hem through which passes the metal rod 15 carrying at its opposite ends the eyes 16, 16 receiving the guide cords 17, 17.

The particular opaque material 12 of the shade 10 may be varied as desired. In the form of the invention illustrated in Fig. 1, the opaque material 12 is cut at its center to form a rectangular opening, in which the transparent and light filtering material 18 is suitably secured. The transparent material 18 is preferably of celluloid of a selected color to provide for effective transparency and to otherwise attain the objects of my invention. Thus, for use on the rear window of an automobile, I have discovered that blue of its various tones is highly effective in affording clear vision either by reflection through the rear vision mirror of the automobile or directly through the transparent material 18 in perceiving the headlights of approaching automobiles but devoid of glare.

Coacting with the sheet 18 of transparent and light filtering material I preferably provide suitable light dissipating means such as closely meshed material 19 in the form of silk fish net, mosquito netting and the like, see Figs. 2 and 3, disposed on one face or both faces of the transparent material 18. Such mesh material 19 is preferably coextensive with the effective extent of the surface of the transparent material 18 and usually is of a shape and area corresponding to the shape and area of the window or opening of the automobile.

It will be understood that the shape and area of the mesh material 19 may be different from the shape and area of the rear window or opening.

It will be understood that other colors for the transparent material may be employed if desired.

The mesh material 19 may be secured to the transparent material 18 in any suitable manner, as by the rows 20, 20 of sewing extending about the edge or marginal portions of the transparent material 18 and the mesh material 19 overlapping the opaque material about the opening thereof; an edge facing material 23 may also be sewed by the stitchings 20, 20 to improve the appearance and give added strength.

By such provision of means, the mesh material 19 is co-extensive with the transparent material 18 over the opening in the opaque material 12. Upon grasping the hand hold 14 or the opaque material 12 when it is desired to lower or raise the shade 10, the resulting tensional strain across the opening in the material 12 is combinedly taken up by the mesh material 19 and the transparent material 18.

As further strength effecting means, I provide the tapes 22, 22 of ribbons or other suitable material sewed at their upper and lower ends respectively in the edge facing 23 and sewings 20, 20 to the opaque material 12.

The mesh material is preferably selected of black or very dark color.

The mesh material 19 coacts with the transparent material 18 in reducing the intensity of the light admitted through transparent material 18, and generally, the smaller the mesh and darker the color of the mesh material the greater the diminution of the light filtered through the curtain.

The mesh material 19 may have hexagonal mesh openings or square mesh openings or other form of mesh opening.

As is illustrated in Fig. 4, on an exaggerated scale, the transparent and mesh material may be combined unitarily as by applying on one face of a sheet 25 of celluloid or the like while in plastic condition a sheet 26 of mesh material, whereby upon cooling the sheet 26 is mechanically embedded on the face of the transparent material 25.

In a similar manner, a sheet 27 of mesh material may be embedded on the opposite face of the transparent material 25. The unitary transparent and mesh material, on one or both faces, may be formed initially in manufacture or at a subsequent stage.

The unitary transparent and mesh material may be formed by embedding the mesh material interiorally within the sheet of transparent material in initial manufacture thereof, or two relatively thin sheets of transparent material may be applied in heated or plastic condition on the opposite faces of a sheet of mesh material and subjected to rolling, pressing or the like.

My invention is also applicable as a curtain for the rear window or other opening in a form to be removably secured in position by means of snap fasteners. Thus, in Fig. 5, I have illustrated the combined transparent material 18 and mesh material 19 in the form of a curtain for the rear opening 28 in the rear curtain portion 29 of an automobile of the touring or similar type. The snap fastener elements 30$^a$ are shown applied to the marginal or facing strip 31 of the curtain and the snap fastener elements 30$^b$ secured to the edging strip 32 of the opening 28. In such form of the invention, it will be noted the curtain embodying my invention serves as the window proper.

In like manner, the shade or curtain illustrated in Fig. 5, may be employed as an adjunct to the glass or other transparent medium serving as the window of the rear opening.

It will be understood that the light filtering medium may be employed without the light retarding medium in carrying out my invention, however, optimum results of my invention are attained by the conjoint use of the light retarding medium and the light filtering medium.

By my invention, the driver is apprised by means of the rear vision mirror reflecting light rays transmitted through the curtain or shade from the headlights or other lights of approaching or passing automobiles, and is not hampered in the operation of the machine by any glare, thus assuring safety, security and comfort in driving at all times. My shade or curtain also provides direct vision therethrough of the headlights of rearwardly approaching and passing automobiles by the occupants of the car and thus affords the sense of security to the occupants as well as to the driver. My shade or curtain also effects a distribution of soft light within the interior of the car and relieves eyestrain to the occupants of the car, and minimizes the reflection of the light from the headlights of approaching and passing automobiles by the glass of the windshield and by the glass of the windows of the door of the automobile.

In the preferred form of my invention, the driver is forewarned of rearwardly approaching automobiles before such automobiles actually come into view in the rear vision mirror through the illumination of the roadway by the headlights of such approaching automobile and the reflection appearing in the rear vision mirror thus giving the driver relatively a clear view of the roadway to the rear.

By my invention, I overcome the disadvantage attendant unprotected rear windows of a sedan or the rear opening of a touring automobile, arising from the reflection of light on the glass of the windshield and seriously interfering with the vision of the driver and other occupants of the automobile. Moreover, the darkened illumination of the interior of the automobile enhances the vision of the driver in the event of bright light due to headlights of forwardly approaching automobiles.

The light retarding medium serves also to improve the appearance of my shade or curtain and tends to eliminate reflection of light from headlights of automobiles approaching from the front or other lights disposed forwardly of the automobile. The light retarding medium serves also to add strength to the light filtering medium and attains privacy to the occupants of the automobile notwithstanding high lighting due to rearwardly or forwardly disposed headlights or other lights.

The invention may also be carried out by etching, printing, engraving or otherwise impressing mesh markings on one or both faces of a celluloid or like light filtering material or by indenting chisel-like impressions in similitude of small prisms corresponding to the mesh openings or by impressing or printing dots or the like in regular or irregular patterns.

The effect of dissipating and retarding the light rays transmitted through the light filtering medium may also be attained by the use of celluloid or the like serving as the light filtering medium by subjecting the celluloid sheet prior to the usual polishing stage of its manufacture by polishing spaced areas corresponding generally to the areas of the mesh openings of the aforesaid mesh material, thus giving rise to alternate areas of polished and non-polished surfaces on one or both faces of the celluloid sheet, or by otherwise effecting regular or irregular patterns of polished and non-polished, or transparent and translucent areas.

For certain uses, the light filtering material may be of glass or other transparent medium and the light retarding and dissipating material may be in the form of metallic or other gauze or mesh, colored or uncolored, in adjunct relation therewith or embedded therein.

If desired, my non-glare device may be mounted to be permanently located in position relative to the window or opening.

My invention affords direct vision from the interior side of the curtain or shade to the exterior side, thereby adapting my invention for windows of sleeping or tourist cars, also as porch screens and the like. In such and similar cases, the color of the mesh material or marking is coordinated with the color of the transparent material to attain relative invisibility of the interior from the exterior and suitable diffusion of the exterior light on the interior.

By the expression "unitarily", it is understood to include all forms of fabric or equivalent forming a part of the celluloid or equivalent by rolling or equivalent treatment therewith and also to include the impressing of the celluloid or equivalent of intaglio or relief markings on the celluloid, which markings are of substantially uniform mesh form and distributed substantially uniformly within the body of the celluloid or equivalent.

My invention is also applicable as a shade or envelope for lamps or other lights of railroad and like stations.

In the preferred form of my invention I employ transparent material such as celluloid but it will be understood that translucent materials or partially transparent materials such as certain fabrics suitable for the purpose may be used alone or in combination with a light retarding and light dissipating medium such as fish net, in which form of the invention the driver is informed of rearwardly approaching or passing automobiles by bright spots or areas appearing on the translucent or partially transparent materials.

Whereas I have described my invention by reference to specific forms thereof, it will be understood that many changes and modifications may be made without departing from the spirit of the invention.

I claim.

1. A rollable non-glare device for the window or opening of an automobile or the like comprising a sheet of flexible light filtering medium of rollable material and superimposed mesh material and means for securing said mesh material to said sheet of light filtering material.

2. A rollable non-glare device for the window or opening of an automobile or the like comprising a sheet of light filtering medium of rollable material and superimposed colored mesh material.

3. A rollable non-glare device for the window or opening of an automobile or the like comprising a light filtering mesh medium unitarily bearing a light diffusing medium.

4. A rollable non-glare device for the window or opening of an automobile or the like comprising a light filtering medium unitarily bearing a light diffusing medium and means for removably positioning said device relative to the rear window or opening.

5. A rollable curtain or shade for the window or opening of an automobile or the like comprising a sheet of colored celluloid, a sheet of colored mesh material, flexible edging material sewed to the edge portions of said sheet of celluloid and said mesh material and removable positioning means for the curtain or shade connected directly to said edging material.

In testimony whereof I have signed this specification this 23 day of July, 1924.

ROSE J. H. LUCAS.